(12) United States Patent
Panchapakesan (10) Patent No.: US 10,055,144 B1
(45) Date of Patent: Aug. 21, 2018

(54) CONFIGURABLE STORAGE DRIVE (71) Applicant: AMAZON TECHNOLOGIES, INC., Seattle, WA (US)

(72) Inventor: Rajan Panchapakesan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 15/084,609

(22) Filed: Mar. 30, 2016

(51) Int. Cl.
  G06F 3/06 (2006.01)
  G06F 12/08 (2016.01)
  G06F 3/14 (2006.01)
  G11B 19/28 (2006.01)
  G06F 12/0888 (2016.01)

(52) U.S. Cl.
  CPC .......... G06F 3/0616 (2013.01); G06F 3/0604 (2013.01); G06F 3/068 (2013.01); G06F 3/0685 (2013.01); G06F 3/14 (2013.01); G06F 12/0888 (2013.01); G11B 19/28 (2013.01)

(58) Field of Classification Search
  CPC ........ G06F 3/0616; G06F 3/0685; G06F 3/14; G06F 3/0604; G06F 3/068; G06F 12/0866; G06F 12/0888; G11B 19/28
  USPC .......................................... 711/103
  See application file for complete search history.

(56) References Cited

U.S. PATENT DOCUMENTS

| | | | | |
|---|---|---|---|---|
| 6,892,249 B1 * | 5/2005 | Codilian | ............. | G06F 3/04847 710/5 |
| 7,636,809 B2 * | 12/2009 | Sutardja | ..................... | G06F 1/32 365/226 |
| 2003/0185109 A1 * | 10/2003 | Tobita | ............... | G11B 11/10508 369/13.47 |
| 2004/0255093 A1 * | 12/2004 | Forrer, Jr. | ............. | G06F 3/0605 711/220 |
| 2007/0214331 A1 * | 9/2007 | Murphy | ................ | G06F 21/567 711/163 |
| 2011/0051275 A1 * | 3/2011 | Ha | ......................... | G06F 3/0607 360/48 |
| 2012/0246435 A1 * | 9/2012 | Meir | ....................... | G06F 13/00 711/169 |
| 2014/0052978 A1 * | 2/2014 | Sung | ..................... | G06F 3/0634 713/100 |

(Continued)

OTHER PUBLICATIONS

Direct-mapped cache, Jun. 13, 2013, UCSB-ECE, Lecture-14.*

*Primary Examiner* — Hal W Schnee
(74) *Attorney, Agent, or Firm* — Blank Rome LLP (57) ABSTRACT

A configurable storage drive includes multiple types of storage such as magnetic media and solid state storage and can implement any of multiple valid configuration modes. A user of the configurable storage drive can select the particular configuration mode so desired to achieve, for example, a desired number of input and output transactions per second. In one example, a service provider network includes multiple such configurable storage drives and customers of the service provider can configure their respective storage drives independently and differently from the other service provider customers. The service provider can opt to provide for selection to its customers all or only a subset of the possible valid configuration modes for selection by the customers. For example, storage drive configuration modes that would result in higher power consumption levels by the storage drives might not be offered to the customers.

6 Claims, 5 Drawing Sheets

| x | Storage Configuration | | | | | |
|---|---|---|---|---|---|---|
| 340 | Mode | IOPS | Amt of Disk Storage | Solid state storage? | Motor Speed | Disk area usage |
| ☐ | 1 | 100 | 8 | N | L | All |
| ☐ | 2 | 200 | 4 | N | M | Outer 50% |
| | ... | | | | | |
| ☐ | n | 350 | 4 | Y | H | Outer 25% |

Configure Storage drive  310

(56) References Cited

U.S. PATENT DOCUMENTS

| | | | |
|---|---|---|---|
| 2015/0248247 A1* | 9/2015 | Andrews | G06F 3/0634 |
| | | | 711/103 |
| 2015/0277764 A1* | 10/2015 | Ehrlich | G06F 3/0616 |
| | | | 711/103 |
| 2016/0036913 A1* | 2/2016 | Romem | G06F 15/167 |
| | | | 709/219 |
| 2016/0284379 A1* | 9/2016 | Igashira | G11B 19/209 |
| 2016/0299850 A1* | 10/2016 | Budiman | G06F 3/06 |
| 2016/0365109 A1* | 12/2016 | Li | G11B 19/28 |
| 2016/0366223 A1* | 12/2016 | Mason | H04L 67/1097 |
| 2017/0060442 A1* | 3/2017 | Dunn | G06F 3/0608 |
| 2017/0262178 A1* | 9/2017 | Hashimoto | G06F 3/0604 |

* cited by examiner

Storage Configuration

| Mode | IOPS | Amt of Disk Storage | Solid state storage? | Motor Speed | Disk area usage |
|---|---|---|---|---|---|
| 1 | 100 | 8 | N | L | All |
| 2 | 200 | 4 | N | M | Outer 50% |
| ... | | | | | |
| n | 350 | 4 | Y | H | Outer 25% |

[Configure Storage drive] — 310

CONFIGURABLE STORAGE DRIVE

BACKGROUND

Many different types of hard disk drives are available. Characteristics that differentiate one hard disk drive from another include the storage capacity of the drive, the access time to read or write data, the number of input and output operations per second (IOPS), and other characteristics. Users and system designers generally select the appropriate hard disk drive for a given application and use case. The selection of the hard disk drive is based on any of the aforementioned performance characteristics, price, etc.

Once a particular hard disk drive is purchased and installed into a system, the drive provides its rated storage size and performance. If it turns out the user later needs a hard disk with a different amount of storage or other performance characteristic, the user can purchase another hard disk drive. Such decisions, however, are costly in terms of the cost of the replacement drive and the maintenance to power off the old drive, disconnect the old drive, install the new drive, connect the new drive to the system, etc.

BRIEF DESCRIPTION OF THE DRAWINGS

For a detailed description of various examples, reference will now be made to the accompanying drawings in which.

DETAILED DESCRIPTION

A configurable storage drive is disclosed herein which can be configured to operate in any of multiple different configuration modes. The configurable storage drive may include magnetic media and solid state storage, either or both of which can be used to store user data. The magnetic media may include one or more magnetic disks (sometimes called platters) that can be rotated by a motor. A read/write head may be positioned near the rotating magnetic media to write data to, or read data from, the media. The solid state storage comprises non-volatile semiconductor storage. Such storage may be referred to as NAND storage.

One or more characteristics of the configurable storage drive can be configured such as the speed at which the motor spins the magnetic media, the amount of capacity of the magnetic storage that is to be used, whether the solid state storage is to be used (e.g., to cache the magnetic storage), the access block size, and which physical area of the magnetic media is to be used. Causing the motor to spin at a faster rate can decrease the time needed to write data to, or read data from, the spinning media, but also may cause the storage drive to consume more power. The amount of magnetic media may comprise a predetermined amount of storage, but less than the full storage capacity of the magnetic media can be used. For example, the storage drive may include 8 terabytes (TB) of storage. In some configurations, all 8 TB of magnetic media is used, while in other embodiments, the storage drive is configured to use less than 8 TB (e.g., 4 TB) of magnetic media storage. In some embodiments, the storage drive may be configured to use the solid state storage to cache the magnetic storage to thereby reduce latency, or not use the solid state storage at all.

Each read or write access of the storage drive may employ an access block size of a configurable amount. For example, 8 KB of the magnetic media may be read with each read access. The access block size may be the same or different between read accesses and write accesses. By varying the access block size, the number of IOPS can be varied as well. All else being equal, accessing the magnetic media in, for example, 4 KB blocks takes less time than accessing the magnetic media in 8 KB blocks. Thus, the number of IOPS for a storage drive configured for 4 KB blocks is greater than the number of IOPS for a storage configured for 8 KB blocks.

The configurable storage drive can be configured as desired by an external management interface (i.e., external to the storage drive). In some implementations, a service provider network includes numerous such configurable storage drives as well as other services for the users of the provider network. The provider network users may specify, for example, a certain number of types of virtual machines, load balancers, encryption, and other services and performance parameters. Users also can specify that mass storage is to be made available to the user and clients of the users. The users may specify the amount of storage desired as well as a performance parameter such as the number of input/output operations per second (IOPS) required for the mass storage. The service provider network may then assign one or more configurable storage drives to that user, as well as program such storage drives per the request of the user. In some embodiments, the user has no direct management interface to specify the configuration of the storage drive and, instead, a management interface within the service provider network configures the storage drives directly. In other embodiments, the user does have access to a management interface such as a user interface to specify the particular configuration desired for the user's storage drives. Users of the service provider network may be assigned exclusive access to individual configurable storage drives. A user assigned to one storage drive may configure that storage drive differently than a storage drive assigned to a different user, or cause the provider network to do so. Thus, users of the service provider network can customize how their assigned configurable storage drives are to perform in terms of, for example, IOPS. Users can configure, or request the provider network to configure, multiple storage drives assigned to the user. Further, the service provider can opt to expose only those storage drive configurations that meet certain goals of the service provider. For example, power consumption may be a significant concern for a service provider, particularly those service providers that operate large data centers. The service provider may elect not to allow its users to configure their storage drives for higher power consumption modes of operations, even though the storage drives could otherwise be configurable for such higher power modes.

Figure 1:
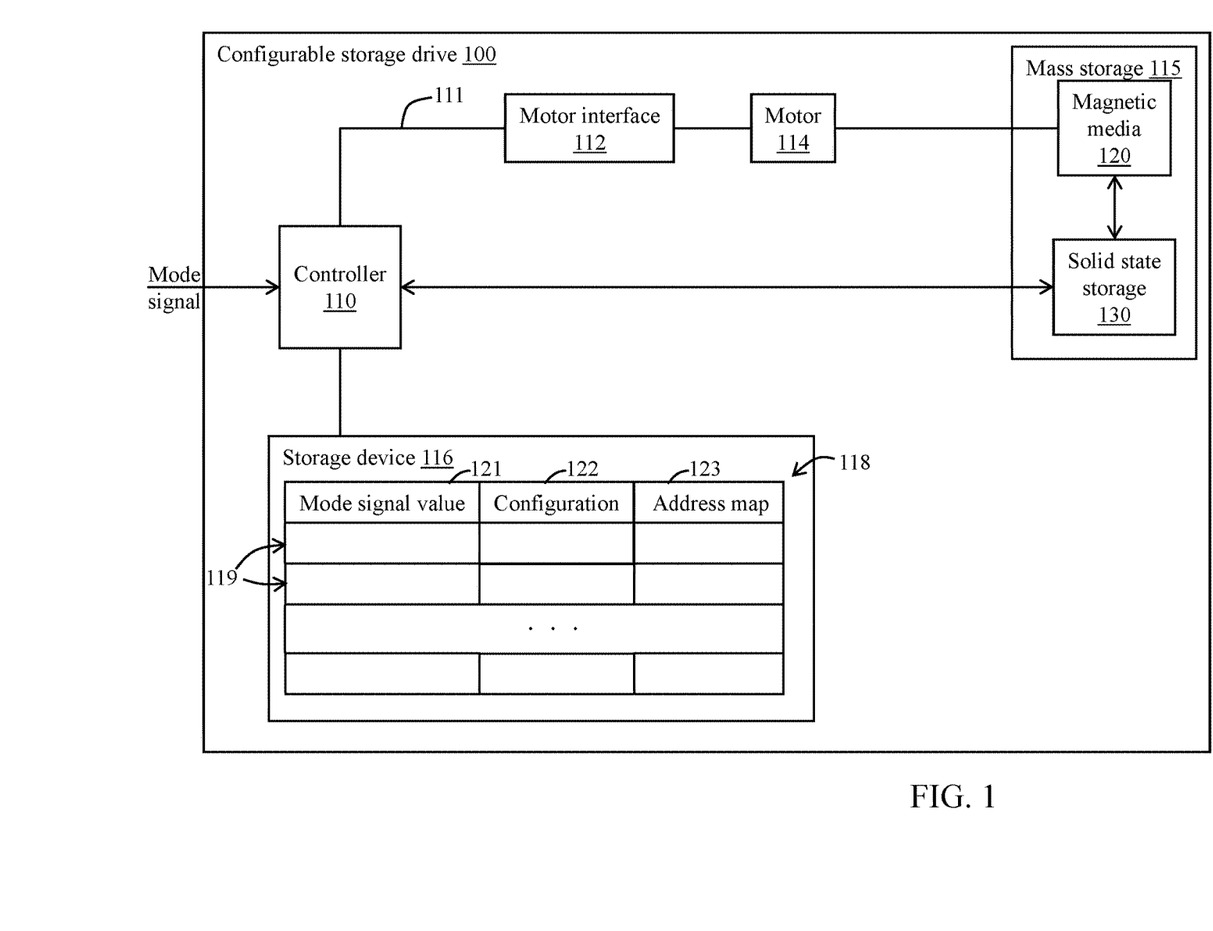
FIG. 1 shows a block diagram of a configurable storage drive in accordance with various examples.

FIG. 1 shows an example of a configurable storage drive 100. The storage drive 100 may include a controller 110, a motor interface 112, a motor 114, a storage device 116, mass storage 115, which includes magnetic storage 120 and solid state storage 130. The storage device 116 may include solid state storage and may be part of, or separate from, the solid state storage 130. The magnetic media 120 includes one or more rotatable magnetic storage disks that are rotated by motor 114. A motor interface receives a programmable motor speed signal 111 from the controller 110. The motor speed signal 111 may be a digital signal such as a pulse width modulated (PWM) signal, a binary value, or other type of digitally-encoded value that indicates the desired motor speed. The motor interface 112 receives the programmable motor speed signal 111 and, in some embodiments, generates an analog voltage to the motor 114. The analog voltage causes the motor 114 to spin at the programmable speed.

The solid state storage 130 comprises any suitable type of non-volatile solid state storage such as electrically erasable programmable read only memory, flash memory, NAND memory, etc. All else being equal, accessing solid state storage 130 is faster than accessing the magnetic media 120. In some embodiments, the solid state storage 130 functions as cache for the magnetic media 120 to improve latency. The solid state storage 130 can be enabled or disabled during the configuration process.

In some embodiments user data can be stored in the magnetic media 120 and, if desired cached in the solid state storage 130. In some embodiments, the solid state storage 130 may be used to store addresses of magnetic media 120 locations which contain user data. User data represents any type of information from a user to be stored on the configurable storage drive 100. User data may include executable code, data, configuration information, or any other type of information that a user might want to store on the storage drive 100.

The storage device 116 may be used to store a data structure 118. The data structure may be implemented in the form of a table, a list, a file, or other type of data structure, and may be structured in any desired manner (e.g., comma delimited, tab delimited, etc.). The data structure 118 includes a plurality of entries 119. Each entry 119 corresponds to a mode signal value 121, and each mode signal value 121 maps to a unique set of configuration parameters 122 and an address map 123. The set of configuration parameters 122 may include one or more configuration parameters. In one example, the configuration parameters include any one or more of a motor speed value, the amount of magnetic media 120 to be used, whether the solid state storage 130 is to be used (e.g., as cache memory), the access block size, and which area of each magnetic platter is to be used. The latter parameter (the area of each magnetic platter is to be used) indicates which portion of each platter is to be used. For example, the storage drive may be configured to store user data only on the outer 50% (or 25%, etc.) of each magnetic storage platter. Data stored at the outer periphery of each platter can be accessed faster than data stored toward the inner portion. The configuration parameters 122 mapped in the data structure 118 to a given mode signal value 121 may include any one or more of the aforementioned parameters, different configuration parameters, or additional configuration parameters. In one example, the configuration parameters 122 include each of the aforementioned configuration parameters.

For a given set of configuration parameters 122, a particular address map 123 also may be stored in the data structure 118. The address map may include logical block addresses (LBA) of the portions of magnetic media 120 and solid state storage 130 that the user can access. The user needs such LBA information in order to correctly access the storage drive. The address map addresses may include a range of addresses for the magnetic media and a range of addresses for the solid state storage. The address map 123 may include addresses that are stored as part of the data structure 118 or may include information from which the controller 110 computes the addresses. For example, the address map 123 in the data structure may specify how magnetic media 120 is to be used (e.g., number of terabytes) and the starting LBA value, and the controller 110 computes the full range of addresses for the magnetic media. The address map 123 is configured to include addresses of locations in the magnetic media (e.g., sectors) that can be used for storage. Thus, locations that are not usable such as interior sectors of the disks can be precluded from being used by omitting such locations from the address map.

The data structure includes at least one mode signal value 122 and corresponding configuration parameters 122 and address map 123. In some embodiments, the data structure 118 includes at least two mode signal values 122 and corresponding configuration parameters 122/address map 123, and in yet other embodiments the data structure 118 includes at least three mode signal values 122 and corresponding configuration parameters 122/address map 123.

During a configuration transaction, the configurable storage drive 100 may receive a mode signal from an external management interface (i.e., external to the storage drive 100 such as external computer). The mode signal may be implemented as a message that includes a value (e.g., a binary value, a bit field, etc.) that is associated with a particular configuration desired by the user for the drive 100. The controller 110 receives the mode signal and uses the mode signal as, for example, an index into the data structure's mode signal value to thereby select the corresponding set of configuration parameters 122. The controller 110 then configures the configurable storage drive 100 based on the configuration parameters 122 retrieved from the data structure 118 in the storage device 116. As such, based on the externally-generated mode signal, the controller is able to generate the programmable motor speed signal 111 to the motor interface 112 for a target motor speed, configure an amount of the magnetic media 120 to be used, determine whether to use the solid state storage 130, and configure an access block size for accessing the magnetic media 120.

After receipt of the mode signal by the controller 110 and use of the mode signal to access the configuration parameters 122 from the data structure 118, the controller also may retrieve (or compute) the address map 123 from the data structure and transmit the address map back to the management interface and to the user of the respective drive. The user then can use the addresses in the address map to correctly access the storage drive 100.

Figure 2:
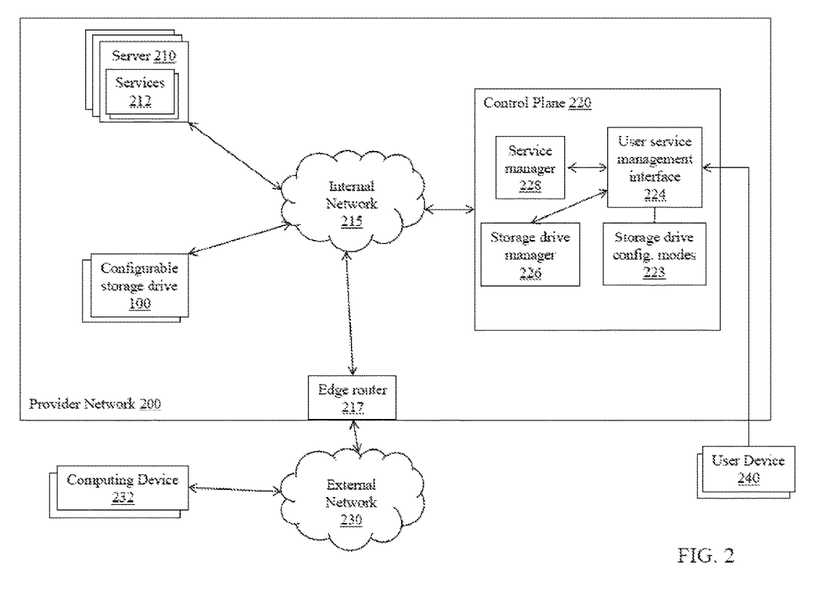
FIG. 2 shows an example of a service provider network which includes configurable storage drives in accordance with various embodiments.

FIG. 2 shows an example of the use of the configuration storage drives 100 in a system 200. In the example of FIG. 2, the system is a service provider network 200 to which users can subscribe. In the context of a service provider network, users may also be referred to as customers (i.e., customers of the service provider). The provider network 200 includes one or more configurable storage drives 100, one or more server computers 210 and a control plane 220 coupled together via an internal network 215. The server computers (or simply servers) 210 include processors, memory, network interfaces, and other hardware. Each server 210 may execute one or more services on behalf of a user as described below.

The internal network 215 may include a collection of switches and routers that permit the various hardware components to send signals such as data or control packets to each other. The network 215 is referred to as "internal"

because it is internal to the provider network. An edge router 217 also is included which provides connectivity to external networks (e.g., external network 230) and devices coupled thereto.

Users of the service provider's provider network 200 may use user devices 240 to access a control plane 220. The user devices 240 may include computers, smart phones, tablet devices, and other types of computing devices that include displays, user input devices (e.g., keyboards, mice, track pads, touch sensitive display, etc.), processor and memory. Each user device 240 may execute a web browser application to permit the user to access various user interfaces of the control plane 220.

The control plane 220 includes one or more computing devices (e.g., servers) that implement, for example, a user service management interface 224, a storage drive manager 226, and a service manager 228. The control plane 220 may have additional software components as well. The control plane 220 allows a user to create specific services 212 for use by the user and the user's clients. In one example, a service 212 includes a virtual machine instance. A virtual machine instance (or simply virtual machine) is a virtualized computer system, or a software implementation of a physical computer system. Virtual machines may provide for multiple and/or different operating system environments to run concurrently on a single server 210 having a processor and memory. In one example, multiple virtual machines of a Linux® operating system environment may execute concurrently with multiple instances of a Microsoft® Windows® operating system environment on a single physical computer. A virtual machine may include or interact with a hypervisor or a virtual machine monitor (or other type of virtualization system) which are programs that execute on the physical computer that allow multiple guest operating systems to share a single hardware host. Each operating system appears to have exclusive access to the host's processor, memory, and other resources. However, the hypervisor controls the host processor and resources, allocating what is needed to each instance's operating system in turn and making sure that the guest operating systems of the virtual machines cannot disrupt each other. Each virtual machine is controlled by a respective service provider customer, who has access only to its own virtual machines and no access to the virtual machines of other customers, even virtual machines of other customers executing on the same physical server 210.

Once the customer's virtual machine instances are created, the customer can load each virtual machine instance with whatever customer-specific applications the customer so chooses. The customer's applications may comprise web server applications, data processing applications, or any other type of back-end functionality that the customer wants to provide to that customer's clients. The customer may use the service provider network to host the customer's website in some embodiments.

In some examples, a service 212 may be a virtual machine as described above. A service 212 may be other than a virtual machine in other examples. For example, a service may be software that runs on the server 210 on behalf of the user to perform a specific function, but not within the environment of a virtual machine.

Each service provider customer may have clients that access the customer's services 212. Such clients may use computing devices 232 which access the customer's services of the provider network through the external network 230. The external network 230 may include a collection of local area network (LANs), broadband networks, wired networks, wireless networks, the Internet, etc. The external network 230 couples to the edge router 217 of the provider network 200. Various equipment, such as computing devices 232, may couple to the external network 230. The computing devices 232 are devices that clients can use to access the service provider customer's services 212 and may include computers (e.g., laptops, notebooks, desktops, etc.), smart phones, tablet devices, etc. The computing devices 232 may include processors and memory and may include a web browser that provides an interface for the client to the targeted service 212.

Using a user device 240, the customer can access the user service management interface 224 in the control plane 220. The customer may access the user service management interface via a web browser on the user device 240, by submission of application programming interface (API) calls, or by way of a command line interface (CLI). Regardless of the manner in which the customer accesses the user service management interface 224, the customer can cause a service 212 to be initiated for the customer, delete an instance of an existing service, modify an existing service, etc. For example, the customer may request that one or more virtual machines be executed on a server 210 to host the customer's software, website, etc. The service manager 228 is responsible for receiving workflow requests from the user service management interface 224 and to implement the requests provided by the customer. For example, the service manager 228 may cause a virtual machine to be executed on a specific server, load a guest operating system on the virtual machine, map the virtual machine to the customer's account, cause a public IP address and a private IP address to be generated for the customer (public IP address being the IP address used by external clients to access the customer's service and the private IP address being an IP addressed used only internally by the service provider), etc.

Some customers may want to attach one or more configurable storage drives 100 to the services 212 they have created. Using the user device 240, a customer can access the user service management interface 224 and select the number of storage drives 100 to use, the total amount of mass storage desired, and/or various performance parameters (e.g., number of IOPS) for each such storage drive as explained above. The control plane 220 includes storage for the various configuration modes that are valid for each respective configurable storage drive 100. Such valid configuration modes are stored in storage drive configuration modes 223, which is accessible to, or included within, the user service management interface 224. The user service management interface 224 selects a suitable configuration for the drive based on the user's specifications and sends a request to the storage drive manager 226 to implement the requested configuration. The storage drive manager 226 may configure multiple storage drives identically on behalf of the customer if the user so desires.

Figure 3:
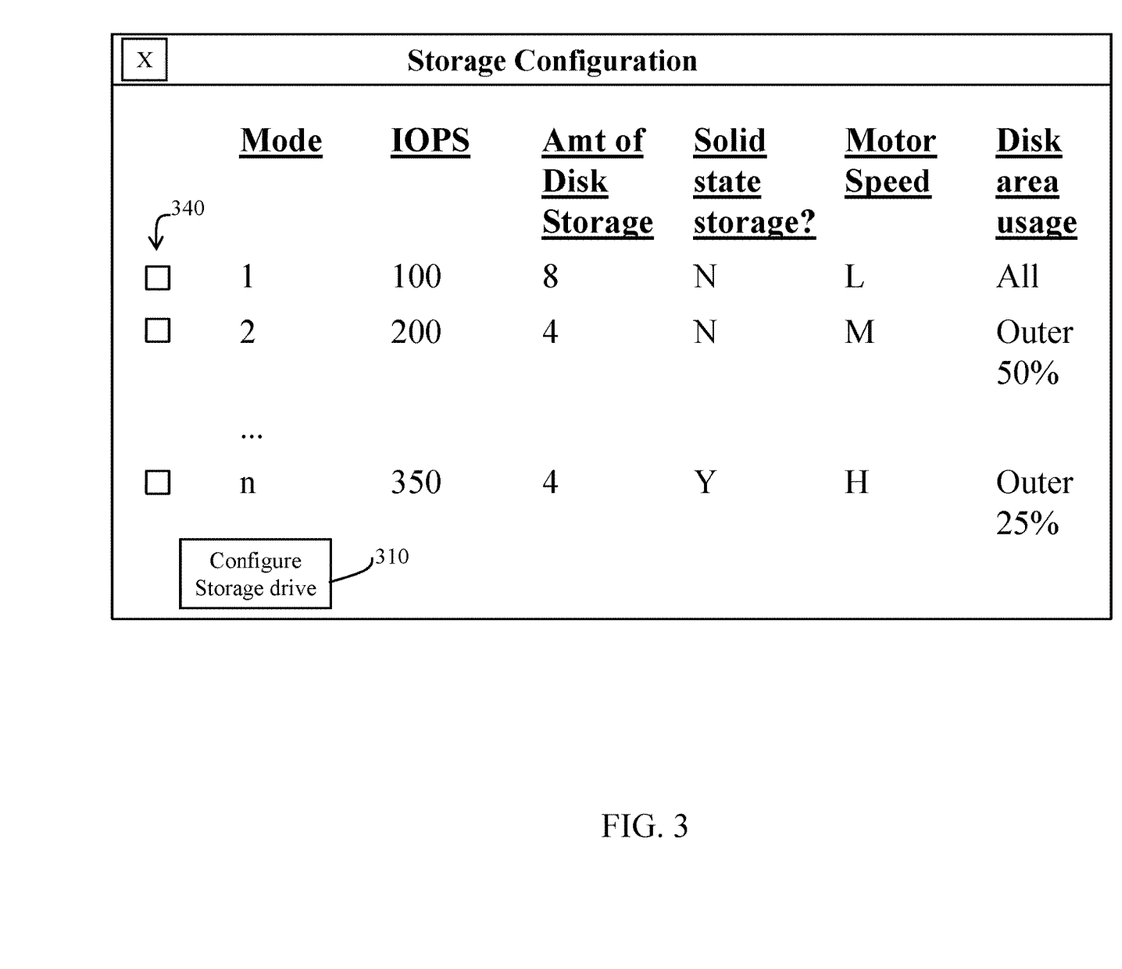
FIG. 3 shows an example of a graphical user interface which permits a user to select a desired configuration mode out of multiple possible valid configuration modes for a target configurable storage drive in accordance with various embodiments.

In other embodiments, the user devices can access a user interface usable for configuring storage drives 100. The user may configure one drive or multiple drives associated with the user. Such a user interface may be included in the control plane 220 and may be part of, or separate from, the user service management interface 224. FIG. 3 illustrates an example of a graphical user interface (GUI) in accordance with various embodiments by which users can select the configuration for the storage drive. The illustrative GUI of FIG. 3 shows that for the configurable storage drive, n different configuration modes are possible. For each different configuration mode, the GUI indicates the number of IOPS, the amount of magnetic disk storage, whether the drive's solid state storage will be used, the motor sped, and the disk area usage. The motor speed may be specified on a relative scale of, for example, low (L), medium (M) or high (H) as shown, or actual motor speed values may be presented (e.g., revolutions per minute). The disk area information may indicate that the entire user area of each disk is used, that only the outer 50% of each disk is used, that only the outer 25% of each disk is used, etc.

The various configuration modes presented to the customer are valid for that particular configurable storage drive. Different storage drives may have different sets of valid configuration modes. Further, not all valid configuration modes for a given storage drive are necessarily offered to the customer. One or more valid configuration modes may not be presented to the customer and thus not selectable by the customer. The service provider, for example, might not want to offer customers higher power consumption configuration modes for the configurable storage drives. A storage drive user interface (not specifically shown in the embodiment of FIG. 2) may access the storage drive configuration modes 223 to determine which configuration modes are valid for a given storage drive and offer just those configuration modes to the customer. In the embodiment described above in which the user service management interface 224 receives a general user specification for the drive but not a specific configuration mode, the user service management interface 224 accesses the storage drive configuration modes 223 and selects a suitable configuration based on whatever the user has specified (e.g., number of IOPS).

In embodiments in which the service provider customer can directly specify a configuration for his or her configurable storage drives, using the user device 240, the customer can select one of the possible configuration modes by selecting one of the radio buttons 340 in FIG. 3 and then selecting the "configure storage drive" button 310. Upon selecting the desired storage drive configuration mode, the storage drive user interface sends a signal or message to the storage drive manager 226. In response, the storage drive manager 226 generates a mode signal based on the selected configuration mode and transmits the mode signal across the internal network 215 to the targeted configurable storage drive 100. In some embodiments, the mode signal may be a predetermined index value (e.g., integer) that maps to specific configurations of the storage drive. In other embodiments, the mode signal may contain the actual configuration data to be implemented by the storage drive (e.g., amount of magnetic media to use, motor speed, etc.). The targeted configurable storage drive 100 implements the configuration mode as explained above and transmits the address map through the storage drive user interface to the customer.

Figure 4:
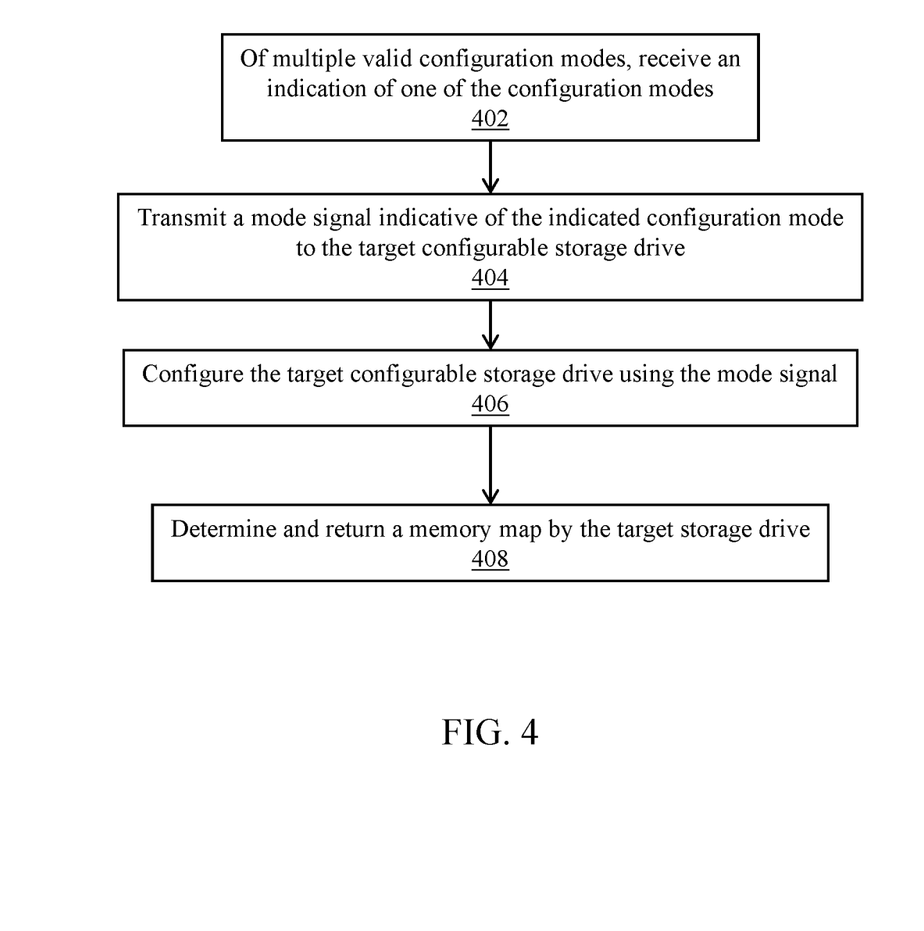
FIG. 4 shows a method for configuring a configurable storage drive in accordance with various embodiments.

At 402, out of multiple valid configuration modes for a target configurable storage drive, an indication of one of the modes is received. The valid configuration modes are configuration modes that the target configurable storage drive 100 can implement. That is, the set of configuration parameters (motor speed, use or non-use of solid state storage, etc.) for each of the configurations modes can be implemented for the storage drive. The provider network (e.g., the user service management interface 224, the service manager 228, etc.) or a user (e.g., a customer of service provider network) can specify the desired configuration mode. In embodiments in which the user service management interface 224 or service manager 228 (or other provider network component) specifies the desired configuration mode for the storage drive, the configuration mode is selected based on, for example, a general performance level indicated by a user such as the number of IOPS and amount of desired mass storage. The configuration mode may be selected from a set of valid configuration modes stored in the storage drive configuration modes 223 for the corresponding storage drive that maps to the specified user performance level. In embodiments in which the user specifies the configuration mode, the mode is specified from a list of valid configuration modes generated by a storage drive user interface and displayed to the user in a web browser on a user device 240. The user selects the desired configuration mode and the storage drive user interface receives an indication from the user device 240 as to which configuration mode the user selected. The storage drive manager 226 also receives the indication of the selected configuration mode from the storage drive user interface.

At 404, the method includes transmitting (e.g., by the storage drive manager 226) a mode signal indicative of the desired configuration mode to the target configurable storage drive 100. The mode signal may include an index value, the actual configuration parameters, or another value indicative of the desired configuration mode. The set of valid configuration modes are stored in each configurable storage device as well as in the storage drive configuration modes 223 in the control plane 220. Thus, the control plane and storage drives are synchronized to the various configuration modes that can be implemented for the storage drives and a mode signal known to both the storage drives and the control plane can be used for the control plane to indicate to a given storage drive which set of configuration parameters are to be implemented by the drive.

The configurable storage drive receives the mode signal from the storage drive manager 226 and at 406 uses the mode signal to configure the storage drive. The mode signal may comprise an index value into the data structure 118 in which the set of configuration parameters 122 are stored. Configuring the storage drive may be performed by the storage drive's controller 110 and, in some embodiments, may include configuring at least one or all of: the motor speed, the amount of magnetic media to be used, whether solid state storage is to be used, the access block size, and the amount of area of each of a plurality of magnetic disks to be used for storing user data. In one example, configuring the storage drive may include configuring an amount of magnetic media to be used, whether solid state storage is to be used, the motor speed, and the access block size.

At 408, the method further includes determining (e.g., retrieving, computing, etc.) the corresponding address map for the configuration and returning the address map from the storage drive to the control plane 220 (e.g., to the storage drive manager 226 and then to the storage drive user interface, or directly to the storage drive user interface. The control plane them may provide to the address map to the customer via the user service management interface 224. The address map may be retrieved from the data structure 118 in the storage drive or computed as explained previously.

Figure 5:
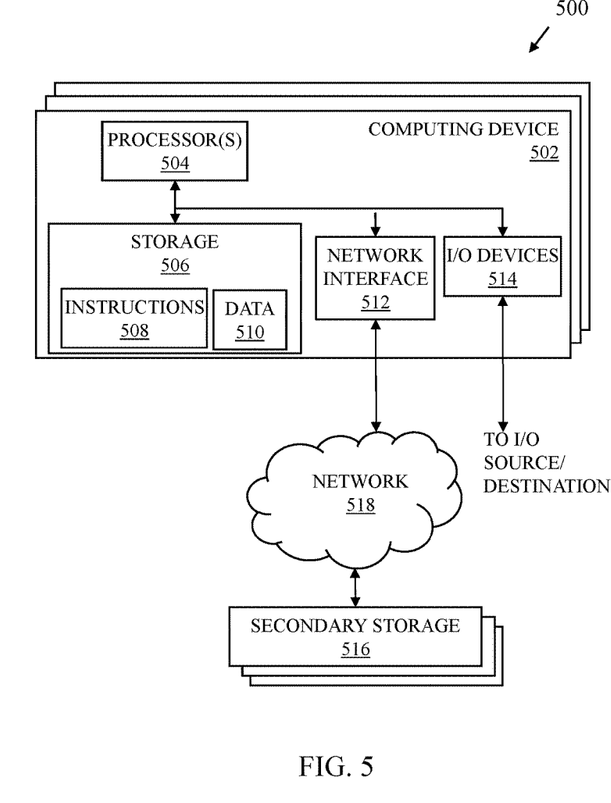
FIG. 5 is a block diagram of a computing device usable to implement the services and functionality described herein in accordance with various embodiments.

FIG. 5 shows a schematic diagram for a computing system 500 suitable for implementation of the some or all of the components described herein such as the storage drive user interface, the storage drive manager 226, the user service management interface 224, the service manager 228, the service 212, and the storage drive configuration modes 223 in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the storage drive manager 226, the user service management interface 224, the service manager 228, the service 212, and the storage drive configuration modes 223.

Each computing device 502 includes one or more processors 504 coupled to memory 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the storage drive user interface, the storage drive manager 226, the user service management interface 224, the service manager 228, the service 212, and the storage drive configuration modes 223, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processor's) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the storage drive user interface 222, the storage drive manager 226, the user service management interface 224, the service manager 228, the service 212, and the storage drive configuration modes 223 disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the certificate manager 110 and other components described herein may be implemented as a separate computing device 502 executing software to provide the computing node with the functionality described herein. In some embodiments, the storage drive user interface, the storage drive manager 226, the user service management interface 224, the service manager 228, the service 212, and the storage drive configuration modes 223 and other components may be implemented by the same computing node.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, wireless telecommunication networks, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

Those skilled in the art will appreciate that computing system 500 is merely illustrative and is not intended to limit the scope of embodiments. In particular, the computing system 500 may include any combination of hardware or software that can perform the functions disclosed herein, including computers, network devices, internet appliances, PDAs, wireless phones, pagers, etc. Computing device 502 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A configurable storage drive, comprising:
   magnetic media;
   a motor to spin the magnetic media at a programmable speed;
   a motor interface coupled to the motor and configured to receive a programmable motor speed signal;
   solid state storage;
   storage for a data structure, wherein the data structure includes a plurality of mode signal values, and wherein each mode signal value is mapped in the data structure to a set of configuration parameters including a motor speed value, an amount of magnetic media to be used, whether the solid state storage is to be used, and an access block size; and
   a processor configured to receive an externally-generated mode signal, and based on the mode signal, to access the data structure to generate the programmable motor speed signal to the motor interface for a target motor speed, configure the amount of the magnetic media to be used, determine whether to use the solid state storage, and configure the access block size for accessing the magnetic media.

2. The configurable storage drive of claim 1, wherein the data structure includes at least three mode signal values.

3. The configurable storage drive of claim 1, wherein the processor is configured to produce an address map based on the externally-generated mode signal, and to transmit the address map to a device external to the configurable storage drive.

4. A method, comprising:
  receiving, from an external management interface, an indication of one of multiple valid configuration modes for a target configurable storage drive;
  transmitting a mode signal comprising an index value indicative of the specified valid configuration mode to the target configurable storage drive, wherein the target configurable storage drive includes a data structure that maps the index value to a corresponding set of configuration parameters, the configuration parameters including an access block size, a motor speed of the target configurable storage drive, whether solid state storage within the target configurable storage drive is to be used, and an amount of magnetic media within the target configurable storage drive that is to be used; and
  using the index value and the data structure to configure, using the mode signal, the motor speed, the amount of magnetic media to be used, whether solid state storage within the target configurable storage drive is to be used, and the access block size of the target configurable storage drive.

5. The method of claim 4, further comprising determining an address map using the mode signal and transmitting, by the target configurable storage drive, the address map.

6. The method of claim 5, wherein determining the address map comprises retrieving the address map from a data structure in the configurable storage drive, wherein the data structure maps mode signals to address maps.

* * * * *